UNITED STATES PATENT OFFICE.

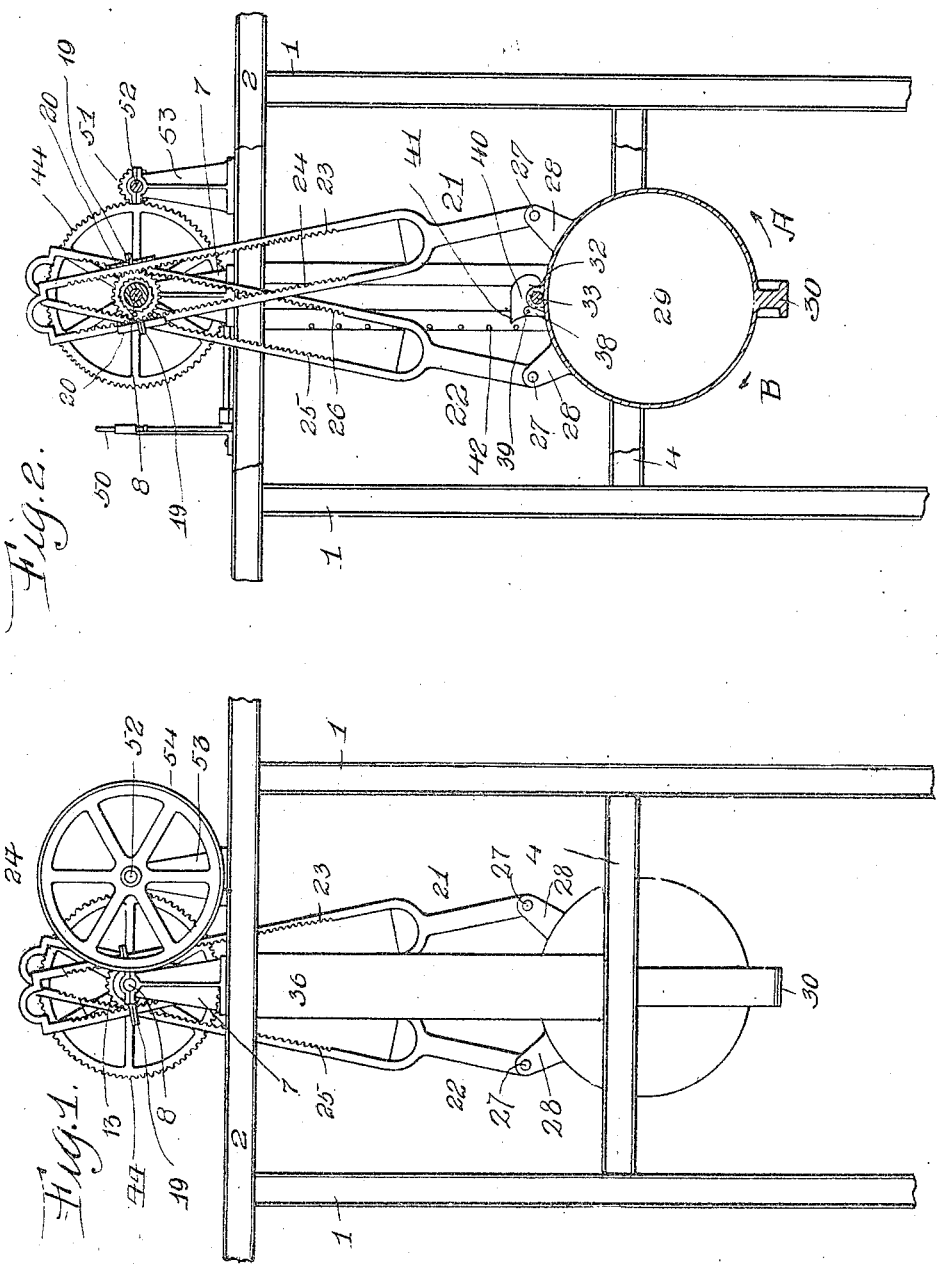

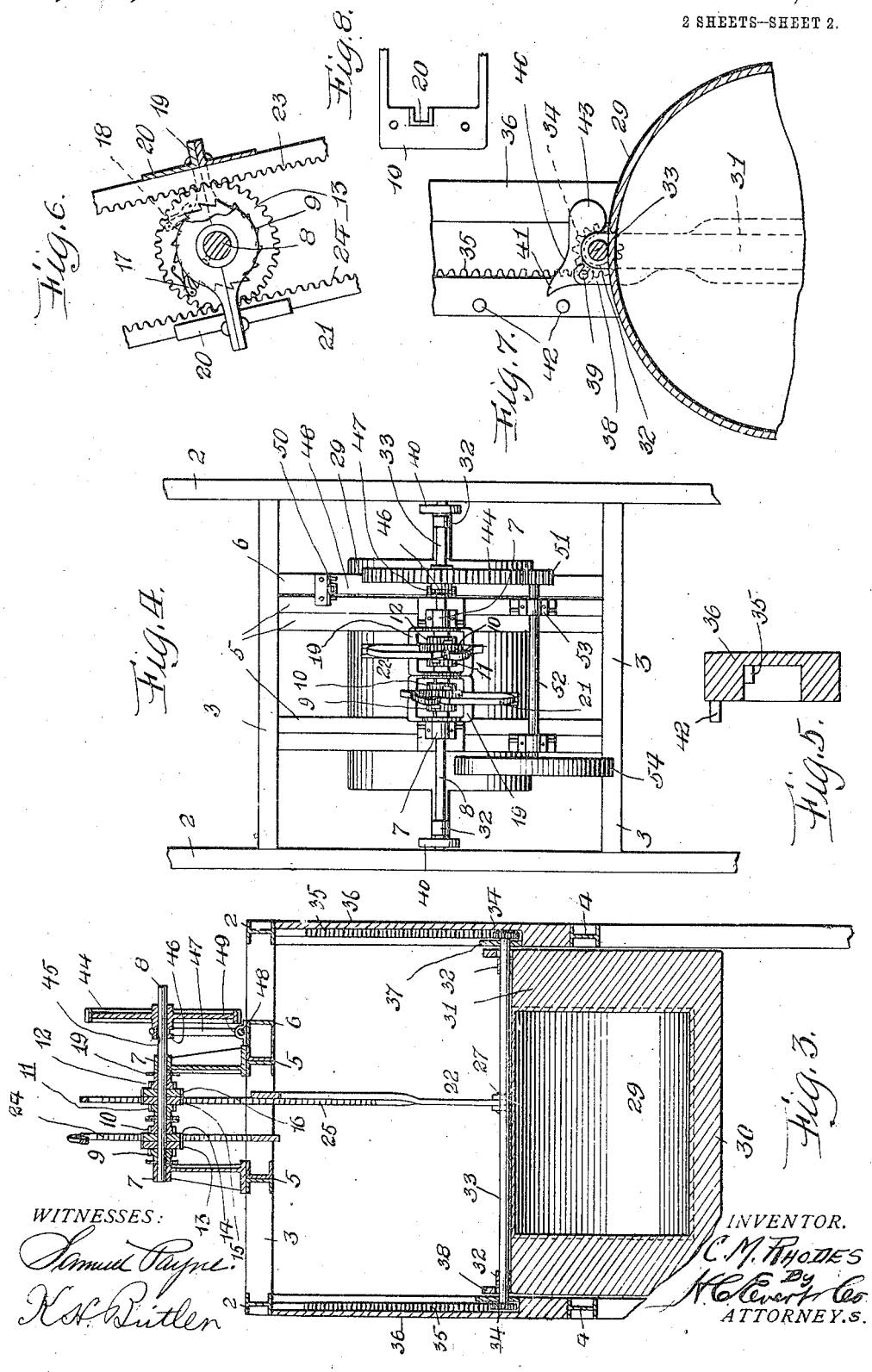

CHARLES M. RHODES, OF STEUBENVILLE, OHIO.

WAVE-ENERGY MOTOR.

1,044,912.   Specification of Letters Patent.   Patented Nov. 19, 1912.

Application filed May 5, 1911. Serial No. 625,141.

*To all whom it may concern:*

Be it known that I, CHARLES M. RHODES, a citizen of the United States of America, residing at Steubenville, in the county of Jefferson and State of Ohio, have invented certain new and useful Improvements in Wave-Energy Motors, of which the following is a specification, reference being had therein to the accompanying drawing.

This invention relates to wave energy motors of the "float" type, and the primary object of the invention is the provision of novel means, in a manner as will be hereinafter set forth, for obtaining power by the undulatory movement of floats upon ocean waves.

Another object of the invention is the provision of novel means in connection with a float whereby power can be derived from the lateral impulse of a wave in either direction, and furthermore, to provide novel means whereby the power derived from a vertical movement of the float and from the lateral impulse of a wave can be transmitted to impart a rotary movement to a shaft.

A still further object of the invention is to accomplish the above results by a mechanical construction that is simple, durable, capable of withstanding the forces of nature, and efficient for generating power that can be used for various purposes.

With the above and such other objects in view as may hereinafter appear, the invention consists of the novel construction, combination and arrangement of parts to be hereinafter specifically described and then claimed.

Reference will now be had to the drawing, wherein:—

Figure 1 is a side elevation of the motor, Fig. 2 is a similar view of the same partly broken away and partly in section, Fig. 3 is a vertical cross sectional view of the motor, Fig. 4 is a plan of the motor, Fig. 5 is an enlarged horizontal sectional view of a rack adapted to form part of the motor, Fig. 6 is an enlarged side elevation of a portion of the ratchet mechanism, Fig. 7 is an enlarged side elevation of a portion of a rack and a detail of the float, and Fig. 8 is a plan of a rack guide.

The reference numeral 1 denotes a plurality of vertical supports adapted to have the lower ends thereof anchored in the bottom of the ocean, said supports having the upper ends thereof connected by longitudinal girders 2 and these girders are connected by transverse beams 3. The supports 1 are connected by longitudinal girders 4, said girders being located at a point below the surface of the water at low tide. The elements 1 to 4 inclusive constitute a suitable elevated structure for supporting the motor a desired and safe distance above the ocean waves, said pier structure being preferably in communication with the ocean shore, whereby power can be easily transmitted to the shore for manufacturing or electric lighting purposes. The motor can be suitably housed upon the pier structure and protected from the destructive force of nature that might render the motor inoperative.

Connecting the beams 3 are longitudinal girders 5 and a channel bar 6. Mounted upon the girders 5 intermediate the ends thereof are vertical bearings 7 for a longitudinal shaft 8. Fixed upon the shaft 8 between the bearings 7 are two sets of ratchet wheels, the ratchet wheels of one set being designated 9 and 10 and the ratchet wheels of another set 11 and 12. The ratchet wheels 9 and 11 have the teeth thereof the reverse of the ratchet wheels 10 and 12. Arranged between the ratchet wheels 9 and 10 and loosely supported upon the shaft 8 are pinions 13 and 14. Loosely mounted upon the shaft 8, between the ratchet wheels 11 and 12, are pinions 15 and 16. The pinions 13 and 15 are provided with spring pressed pawls 17 adapted to mesh with the ratchet wheels 9 and 11. The pinions 14 and 16 have spring pressed pawls 18 adapted to mesh with the ratchet wheels 10 and 12.

Loosely mounted upon the hubs of the ratchet wheels 9 to 12 inclusive are rectangular rack guides 19 having vertical housings 20 for double racks generally designated 21 and 22, the teeth 23 and 24 of the rack 21 mesh with the pinions 13 and 14 respectively and the teeth 25 and 26 of the rack 22 mesh with the pinions 15 and 16 respectively. The lower ends of the racks 21 and 22 are pivotally connected by pins 27 to apertured lugs 28, carried by the upper side of a hollow cylindrical closed float 29. The bottom of this float is provided with a stiffening rib 30 that extends upwardly at the ends thereof, as at 31 and is provided with bearings 32 for a rotatable rod 33 whereby the float is loosely suspended on said rod 33. Mounted upon the ends of the rod 33 are pinions 34 adapted to travel between stationary racks 35, arranged within vertical channel bars 36 carried by the girders 4, said channel bars extending from the girders 4 to the longitudinal girders 2. The pinions 34 insure an even and perfectly balanced vertical movement of the rod 33 between the bars 36. The ends of the rod 33 adjacent to the pinions 34 have guide blocks 37 slidable between the sides of each channel bar, and adjacent to these blocks are brackets 38, carried by the ends of the float. Pivotally connected to the brackets 38 by pins 39 are fulcrumed gravity members 40 having teeth 41 adapted to engage inwardly extending equally spaced pins 42, carried by one side of each of the channel bars 36. The members 40 are weighted, as at 43 to normally remain in the position shown in Fig. 7 of the drawings.

The lateral impulse of a wave can move the float 29 in two directions and the swell of the wave can elevate the float and the float will descend by gravity.

When the float 29 is moved in the direction of the arrow A, the members 40 engage the pins 42, the lateral impulse of a wave tends to slightly elevate the float and swing it out in the direction of the arrow A to approximately a horizontal position. Such movement of the float elevates the double rack 21 and lowers the double rack 22. When the racks are moved the pinions 13 to 16 inclusive are moved, but only two of the pinions move in the proper direction to shift two of the ratchet wheels and consequently the shaft 8 will only be revolved in one direction. When the float moves toward its normal position or from normal in the direction of the arrow B it swings upon the rod 33 and causes the double rack 22 to be elevated and the rack 21 lowered operating thereby the pinions 13 to 16, but only two of the pinions move in the proper direction to shift two of the ratchet wheels so that the shaft 8 will continue to operate in the proper direction. When the float is moved in the direction of the arrow B the movement is independent of any operation of the members 40, these latter coming into operation only when the float is shifted in the direction of the arrow A. When the float 29 is elevated by a wave the double racks 21 and 22 coöperate in imparting a rotary movement to the shaft 8, these racks operating two of the pinions and two of the ratchet wheels, the others remaining idle due to the fact that the spring pressed pawls recede over the ratchet wheels when the pinions supporting said pawls are revolved.

One manner of obtaining power from the shaft 8 is illustrated in Figs. 3 and 4, and which comprises a large gear wheel 44 slidably mounted upon the shaft 8 and is shifted into and out of engagement with a spline 45, carried by said shaft, by a sleeve 46 on an arm 47 connected to said sleeve and mounted upon a shaft 48, journaled in bearings 49 carried by the channels bars 36. The end of the shaft 48 has a conventional form of operating lever 50. The large gear wheel 44 meshes with a small gear wheel 51 mounted upon a shaft 52, journaled in bearings 53, carried by the girders 5. The shaft 52 has a large belt wheel 54 adapted to transmit power, through the medium of a belt to a motor or any other machinery located upon the pier or elevated structure. If desired a motor can be coupled direct to the shaft 52 and the electricity generated transmitted to the shore by suitable cables or conductors.

From the foregoing it will be observed that I have devised novel means imparting a rotary movement to a shaft from an oscillatory float arranged to be actuated by the lateral impulse or force of a wave, also by the swell or fall and rise of the surface of the wave. The motor herein shown and described can be used as a unit of a plant located upon a long pier extending into the ocean, whereby sufficient power can be generated for manufacturing or municipal lighting purposes.

The invention is susceptible to such variations as fall within the scope of the appended claims.

What I claim is:—

1. In a wave energy motor, a pier, vertical racks carried by said pier, a rod, pinions carried by the ends of said rod and adapted to move upon said racks, a float carried by said rod, double racks pivotally connected to said float, a revoluble shaft supported by said pier, and a ratchet mechanism carried by said shaft and adapted to be actuated by said double racks.

2. In a wave energy motor, vertical racks, a rod having the ends thereof guided between said racks, a float suspended from said rod, double racks pivotally connected to the upper side of said float, a revoluble shaft, and a ratchet mechanism actuated by said double racks for imparting a rotary movement to said shaft.

3. In a wave energy motor, vertical racks, a rod having the ends thereof guided between said racks, a float suspended from said rod, double racks pivotally connected to the upper side of said float, a revoluble shaft, a ratchet mechanism actuated by said double racks for imparting a rotary movement to said shaft, and fulcrumed members arranged in the ends of said float and serving functionally as a fulcrum for the movement of said float in one direction.

4. In a wave energy motor, a pier, a rod movably supported by said pier, a float suspended from said rod, double racks pivotally connected to the upper side of said float, a revoluble shaft, and ratchet mechanisms arranged upon said shaft and adapted to be actuated by said double racks to impart a rotary movement to said shaft.

5. In a wave energy motor, a pier, a rod movably supported by said pier, a float suspended from said rod, double racks pivotally connected to the upper side of said float, a revoluble shaft, ratchet mechanisms arranged upon said shaft and adapted to be actuated by said double racks to impart a rotary movement to said shaft, rack guides movably arranged upon said shaft, and fulcrumed members carried by the ends of said float and adapted to serve functionally as a fulcrum for a movement of said float.

6. In a wave energy motor, a pier, a vertically movable float slidably mounted beneath said pier and actuated by the waves, racks adapted to guide said float, a revoluble shaft, elements carried by said float, and means arranged upon said shaft and adapted to be actuated by said elements for imparting a rotary movement to said shaft.

7. In a wave energy motor, vertical racks, an oscillatory float movably guided by said racks, double racks actuated by a movement of said float, a shaft, and means actuated by said double racks and adapted to impart a rotary movement to said shaft.

8. In a wave energy motor, a vertically movable pivoted float adapted to be actuated by the lateral impulses of the waves, a revoluble shaft, double racks having their lower ends pivotally connected to said float, means carried by said shaft and adapted to be actuated by said double racks for imparting a rotary movement to said shaft, vertical movable means for pivotally suspending the float and means adapted to evenly guide the vertical movement of said suspension means.

In testimony whereof I affix my signature in the presence of two witnesses.

CHARLES M. RHODES.

Witnesses:
 MAX H. SROLOVITZ,
 CHRISTINA T. HOOD.